United States Patent
Rijken et al.

(10) Patent No.: US 11,422,966 B2
(45) Date of Patent: Aug. 23, 2022

(54) INPUT DATA SWITCHES

(71) Applicant: HEWLETT-PACKARD DEVELOPMENT COMPANY, L.P., Houston, TX (US)

(72) Inventors: Christopher Rijken, Houston, TX (US); Michael L. Nash, Clyde Hill, WA (US); Khaldoun Alzien, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/083,538

(22) PCT Filed: May 1, 2017

(86) PCT No.: PCT/US2017/030340
§ 371 (c)(1),
(2) Date: Sep. 10, 2018

(87) PCT Pub. No.: WO2018/203869
PCT Pub. Date: Nov. 8, 2018

(65) Prior Publication Data
US 2020/0379940 A1 Dec. 3, 2020

(51) Int. Cl.
*G06F 13/42* (2006.01)
*G06F 9/4401* (2018.01)
(Continued)

(52) U.S. Cl.
CPC ........ *G06F 13/4282* (2013.01); *G06F 9/4401* (2013.01); *G06F 2213/0042* (2013.01)

(58) Field of Classification Search
CPC ............... G06F 13/4282; G06F 9/4401; G06F 2213/0042; G06F 3/1454; G09G 2370/22;
(Continued)

(56) References Cited

U.S. PATENT DOCUMENTS

| | | |
|---|---|---|
| 5,831,447 A | 11/1998 | Chaw |
| 6,073,188 A | 6/2000 | Fleming |

(Continued)

FOREIGN PATENT DOCUMENTS

| | | |
|---|---|---|
| CN | 1313701 | 9/2001 |
| CN | 103116386 | 5/2013 |

(Continued)

OTHER PUBLICATIONS

Hirofuchi et al., "USB/IP—A Peripheral Bus Extension for Device Sharing Over IP Network", USENIX, Retrieved from Internet—http://static.usenix.org/legacy/events/usenix05/tech/freenix/hirofuchi/hirofuchi_html/, 2005, 16 Pages.

*Primary Examiner* — Idriss N Alrobaye
*Assistant Examiner* — Henry W Yu
(74) *Attorney, Agent, or Firm* — HP Inc. Patent Department

(57) ABSTRACT

An example method comprises establishing, via a first data communication interface of a first computing device, a physical connection to between the first computing device and a second computing device. The method also includes receiving, at the first computing device, input data via a second data communication interface of the first computing device. The method further includes controlling an operation at the first computing device based on the input data when the input data is received prior to establishing the connection. The method further includes routing the input data to the second computing device via an input data switch of the first computing device when the input data is received after establishing the connection.

16 Claims, 6 Drawing Sheets

(51) Int. Cl.
*G09G 5/00* (2006.01)
*H04Q 11/00* (2006.01)
*H04L 49/253* (2022.01)
*G06F 3/14* (2006.01)
*H04L 67/08* (2022.01)
*H04Q 11/06* (2006.01)

(58) Field of Classification Search
CPC ........ G09G 5/003; H04Q 11/00; H04Q 11/06; H04L 49/253; H04L 67/08
See application file for complete search history.

(56) References Cited

U.S. PATENT DOCUMENTS

| | | | |
|---|---|---|---|
| 6,098,120 A | 8/2000 | Yaotani | |
| 6,125,417 A * | 9/2000 | Bailis | G06F 13/4081 |
| | | | 713/340 |
| 6,363,452 B1 * | 3/2002 | Lach | G06F 13/4081 |
| | | | 710/316 |
| 6,377,082 B1 | 4/2002 | Loinaz et al. | |
| 6,765,543 B1 * | 7/2004 | Masuda | G06F 3/14 |
| | | | 345/1.1 |
| 7,133,938 B2 * | 11/2006 | Nagao | G06F 9/4411 |
| | | | 710/10 |
| 8,190,785 B2 * | 5/2012 | Hill | G06F 9/4413 |
| | | | 710/8 |
| 8,484,403 B2 | 7/2013 | Wu et al. | |
| 8,769,172 B2 * | 7/2014 | Softer | G06F 13/00 |
| | | | 710/64 |
| 9,053,250 B2 * | 6/2015 | Halim | G06F 3/147 |
| 9,477,437 B2 | 10/2016 | Ferry et al. | |
| 2003/0115395 A1 * | 6/2003 | Karcher | G06F 1/1632 |
| | | | 710/303 |
| 2003/0167367 A1 * | 9/2003 | Kaushik | G06F 13/4081 |
| | | | 710/302 |
| 2004/0044822 A1 * | 3/2004 | Chen | G06F 3/023 |
| | | | 710/312 |
| 2007/0065157 A1 | 3/2007 | Katagiri et al. | |
| 2007/0116038 A1 * | 5/2007 | Holt | H04L 12/66 |
| | | | 370/465 |
| 2009/0234983 A1 | 9/2009 | Golden et al. | |
| 2010/0257380 A1 * | 10/2010 | Huang | G06F 1/266 |
| | | | 713/300 |
| 2011/0113166 A1 | 5/2011 | Hung et al. | |
| 2011/0153871 A1 * | 6/2011 | Ferragut, II | A47L 15/006 |
| | | | 710/8 |
| 2013/0166629 A1 | 6/2013 | Ivashin et al. | |
| 2014/0019652 A1 | 1/2014 | Soffer | |
| 2014/0289431 A1 * | 9/2014 | Chien | G06F 13/4072 |
| | | | 710/62 |
| 2015/0227485 A1 * | 8/2015 | Maung | G06F 13/4022 |
| | | | 710/316 |
| 2015/0234764 A1 * | 8/2015 | Kline | G06F 13/126 |
| | | | 710/5 |

FOREIGN PATENT DOCUMENTS

| | | |
|---|---|---|
| CN | 105378692 | 3/2016 |
| CN | 105871586 | 8/2016 |
| GB | 2518206 A | 3/2015 |

* cited by examiner

INPUT DATA SWITCHES

BACKGROUND

Some standalone computing devices may serve as a peripheral device for another computing device. For examples, the built-in display of an All-in-One (AiO) computer may serve as an additional display for another computer.

BRIEF DESCRIPTION OF THE DRAWINGS

Some examples of the present application are described with respect to the following figures.

DETAILED DESCRIPTION

When a built-in display of an All-in-One (AiO) computer serves as an additional display for another computer, such as a notebook computer, peripheral device(s) connected to the AiO computer may not be shared by the other computer. Thus, reducing the usefulness of the peripheral device(s).

Examples described herein provide an input data switch to selectively route input data received at a first computing device (e.g., the AiO computer) between the first computing device and a second computing device (e.g., the notebook computer). Thus, the input data can be used to control the second computing device when the two computing devices are connected.

For example, a method may include establishing, via a first data communication interface of a first computing device, a physical connection to between the first computing device and a second computing device. The method may also include receiving, at the first computing device, input data via a second data communication interface of the first computing device. The method may further include controlling an operation at the first computing device based on the input data when the input data is received prior to establishing the connection. The method may further include routing the input data to the second computing device via an input data switch of the first computing device when the input data is received after establishing the connection.

In another example, a first computing device may include a controller. The first computing device may also include a first data communication interface to establish a connection between the first computing device and a second computing device. The first computing device may further include a second data communication interface to receive input data. The first computing device may further include an input data switch. The input data switch may, based on a detection of the connection, remove a data path between the controller and the second data communication interface. The input data switch may also, based on the detection, route the input data to the second communication device via the first communication interface. In this manner, examples described herein may reduce difficulty associated with sharing an input device between two connected computing devices.

Figure 1A:
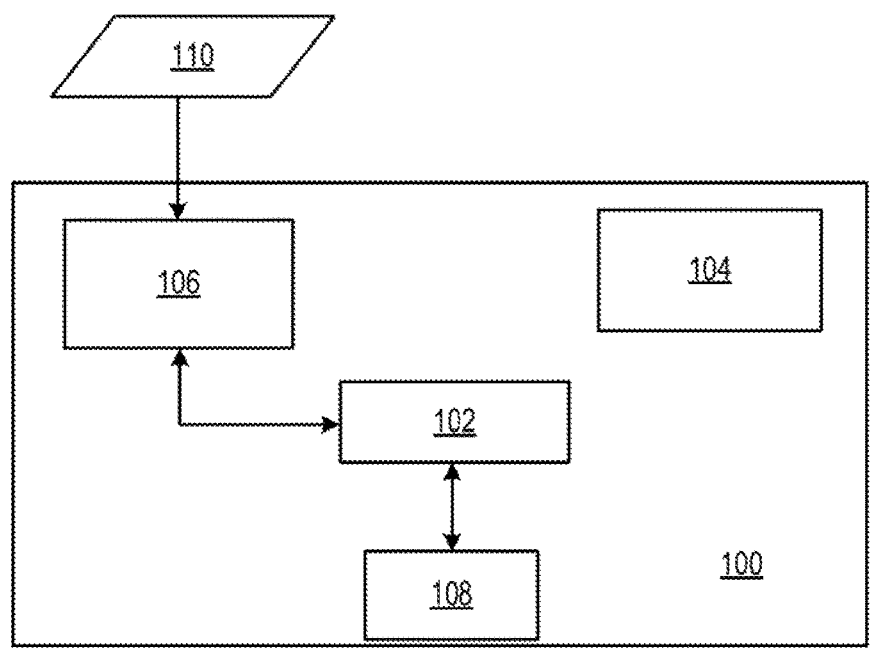
FIG. 1A illustrates a first computing device having an input data switch to selectively route input data between the first computing device and a second computing device, according to an example.

FIG. 1A illustrates a first computing device 100 having an input data switch 102 to selectively route input data between first computing device 100 and a second computing device, according to an example. First computing device 100 may be, for example, a notebook computer, a desktop computer, an AiO computer, a tablet computing device, a mobile phone, an electronic book reader, or any other electronic device suitable to connect to an input device and to a second computing device.

First computing device 100 may include input data switch 102, a first data communication interface 104, a second data communication interface 106, and a controller 108. Input data switch 102 may selectively route input data received at first computing device 100 to controller 108 or to a second computing device. Input data switch 102 may selectively route the input data based on whether the second computing device is connected or docked to first computing device 100. Input data switch 102 may be connected to first data communication interface 104, second data communication interface 106, controller 108, or a combination thereof.

Data communication interfaces 104 and 106 may be any type of physical port that enables electronic communication between first computing device and other devices. Controller 108 may be, for example, a central processing unit (CPU), a semiconductor-based microprocessor, and/or other hardware devices suitable for retrieval and execution of instructions stored in a computer-readable storage medium.

During operation, first computing device 100 may not be connected to another computing device via first data communication interface 104. Input data switch 102 may establish a data path between second data communication interface 106 and controller 108. Data communication interfaces 104 and 106 may be logically isolated from each other. First computing device 100 may receive input data 110 at second data communication interface 106. For example, first computing device 100 may receive input data 110 from an input device (not shown in FIG. 1A) connected to first computing device 100 via second data communication interface 106. An example input device may include a mouse, a keyboard, a touch sensitive display, etc. Input data switch 102 may route input data 110 from second data communication interface 106 to controller 108 via the data path. Controller 108 may process input data 110 to control an operation of first computing device 100. When a second computing device is connected to first computing device 100, input data switch 102 may route input data received at second data communication interface 106 to the second computing device instead of controller 108, as described in more detail in FIG. 1B.

Figure 1B:
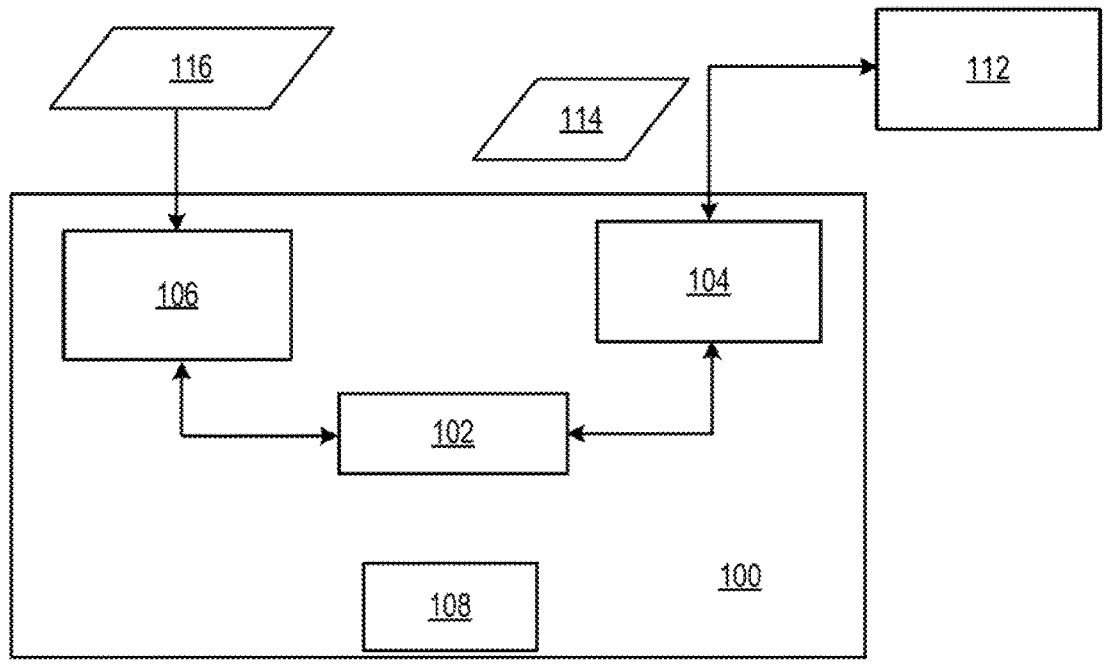
FIG. 1B illustrates a first computing device having an input data switch to selectively route input data between the first computing device and a second computing device, according to an example.

FIG. 1B illustrates first computing device 100 having input data switch 102 to selectively route input data between first computing device 100 and a second computing device 112, according to an example. Second computing device 112 may be, for example, a notebook computer, a desktop computer, an AiO computer, a tablet computing device, a mobile phone, an electronic book reader, or any other electronic device suitable to connect to another computing device.

Second computing device 112 may be connected to first computing device 100 via first data communication interface 104. In some examples, second computing device 112 may be docked to a docking station (not shown in FIG. 1B) that is connected to first computing device 100 via first data communication interface 104. Input data switch 102 may detect a signal 114 at first data communication interface 104 that is indicative of an establishment of a physical connection between computing devices 100 and 112. Signal 114 may be a video source signal, a power signal, an audio signal, a data bus signal, or a combination thereof. Second computing device 112 may assert signal 114 when the physical connection is established. In an example, signal 114 may be a hot plug detect (HPD) signal compliant with the High-Definition Multimedia Interface (HEMI) protocol.

In response to detecting signal 114 at input data switch 102, input data switch 102 may disable the data path between second data communication interface 106 and controller 108. Input data switch 102 may also establish a second data path between data communication interfaces 104 and 106. Thus, first data communication interface 104 may be logically bridged to second data communication interface 106 via input data switch 102. When first computing device receives input data 116 at second data communication interface 106, input data switch 102 may route input data 116 from second data communication interface 106 to second computing device 112 via first data communication interface 104. Second computing device 112 may process input data 116 to control operations of second computing device 112 and/or first computing device 100.

Figure 2:
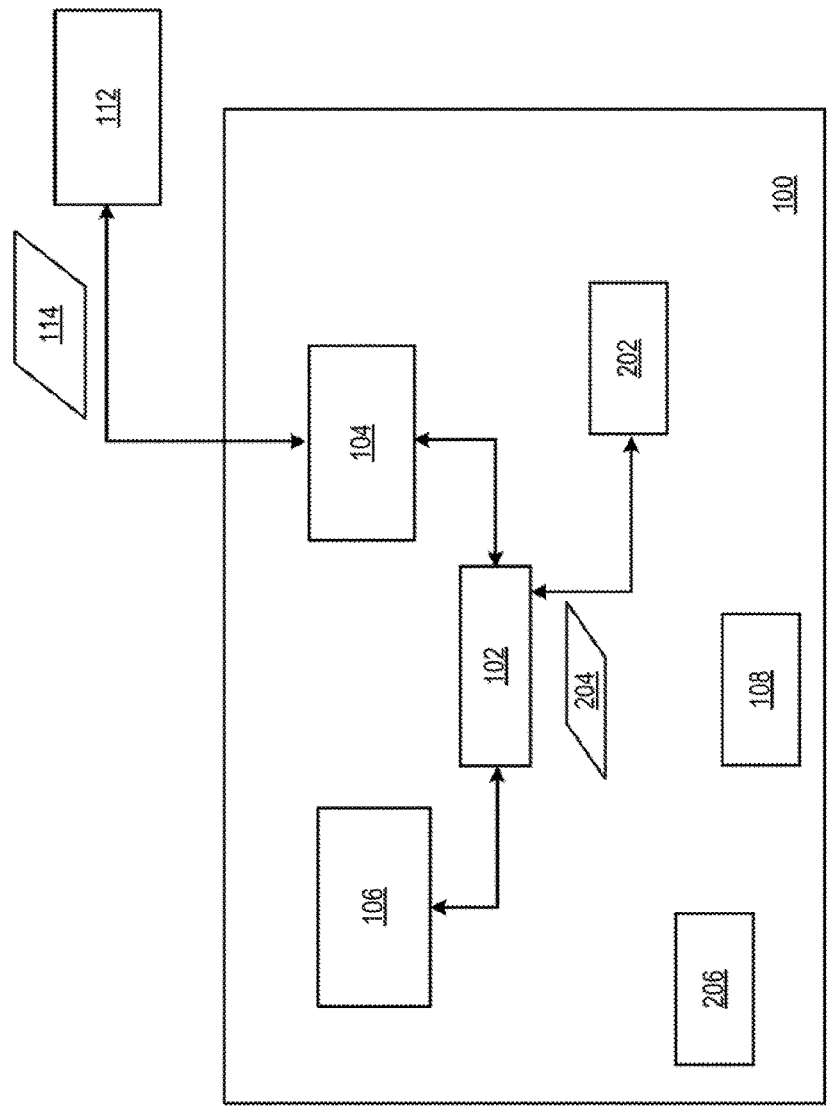
FIG. 2 illustrates a first computing device having an input data switch to selectively route input data between the first computing device and a second computing device, according to an example.

FIG. 2 illustrates first computing device 100 having input data switch 102 to selectively route input data between first computing device 100 and second computing device 112, according to an example. In some example, first computing device 100 may also include a Basic Input/Output System (BIOS) 202. BIOS 202 may be implemented as a set of instructions that control configurations of first computing device 100. In some examples, BIOS 202 may assert an enable signal 204 to input data switch 102 to enable input data switch 102 to perform selective routing as described in FIGS. 1A and 1B.

When input data switch 102 does not detect enable signal 204, input data switch 102 may only route input data (e.g., input data 110, input data 116) from second data communication interface 106 to controller 108. When input data switch 102 detects enable signal 204, input data switch 102 may change how input data received at second data communication interface 106 is routed based on the presence of signal 114.

In some examples, first computing device 100 may also include a display 206. When second computing device 112 is connected to first computing device 100, display 206 may serve as a display for second computing device 112.

Figure 3:
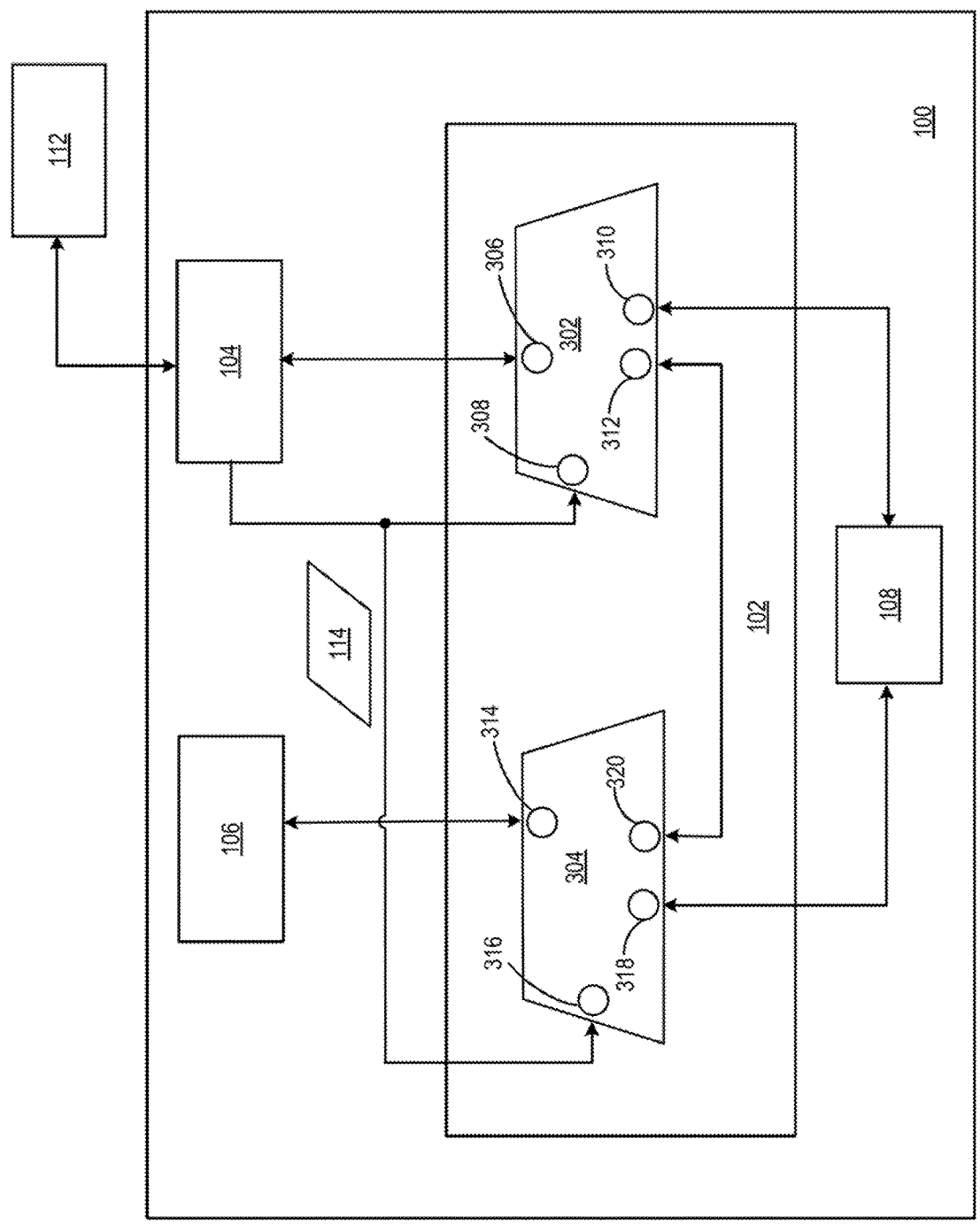
FIG. 3 illustrates an implementation of an input data switch to selectively route input data between a first computing device and a second computing device, according to an example.

FIG. 3 illustrates an implementation of input data switch 102 to selectively route input data between first computing device 100 and second computing device 112, according to an example. In some examples, input data switch 102 may be implemented using a plurality of multiplexers. In an example, input data switch 102 may be implemented using a first multiplexer 302 and a second multiplexer 304. Multiplexers 302 and 304 may be digital bidirectional multiplexers.

First data communication interface 104 may be connected to a data port 306 of first multiplexer 302. First data communication interface 104 may also be connected to a selector port 308 of first multiplexer 302. Controller 108 may be connected to first multiplexer 302 via a data port 310 of first multiplexer 302. Second multiplexer 304 may be connected to first multiplexer 302 via a data port 312 of first multiplexer 302.

Second data communication interface 106 may be connected to a data port 314 of second multiplexer 304. First data communication interface 104 may also be connected to a selector port 316 of first multiplexer 302. Controller 108 may be connected to second multiplexer 304 via a data port 318 of second multiplexer 304. Second multiplexer 304 may be connected to first multiplexer 302 via a data port 320 of second multiplexer 304. Connections between first data communication interface 104 and selector ports 308 and 316 may be unidirectional. Connections to data ports of each multiplexer 302 and 304 may be bidirectional.

During operation, multiplexers 302 and 304 may detect the presence of signal 114 via selector ports 308 and 316, respectively. When signal 114 is absent, first multiplexer 302 may connect data port 306 to data port 310 so that a data path is established between first data communication interface 104 and controller 108. Thus, first multiplexer 302 may route input data received at first data communication interface 104 to controller 108 for processing. When signal 114 is absent, second multiplexer 304 may connect data port 314 to data port 318 to establish a data path between second data communication interface 106 and controller 108. Thus, second multiplexer 304 may route input data received at second data communication interface 106 to controller 108 for processing.

In response to detecting signal 114 at selector port 308, first multiplexer 302 may connect data port 306 to data port 312. Thus, the data path between first data communication interface 104 and controller 108 may be removed. In response to detecting signal 114 at selector port 316, second multiplexer 304 may connect data port 314 to data port 320. Thus, the data path between second data communication interface 106 and controller 108 may be removed. Also, by connecting data port 306 to data port 312 and connecting data port 314 to data port 320, a data path between first data communication interface 104 and second data communication interface 106 may be established. Thus, input data (e.g., input data 110, input data 116) received at second data communication interface 106 may be routed to second computing device 112.

Figure 4:
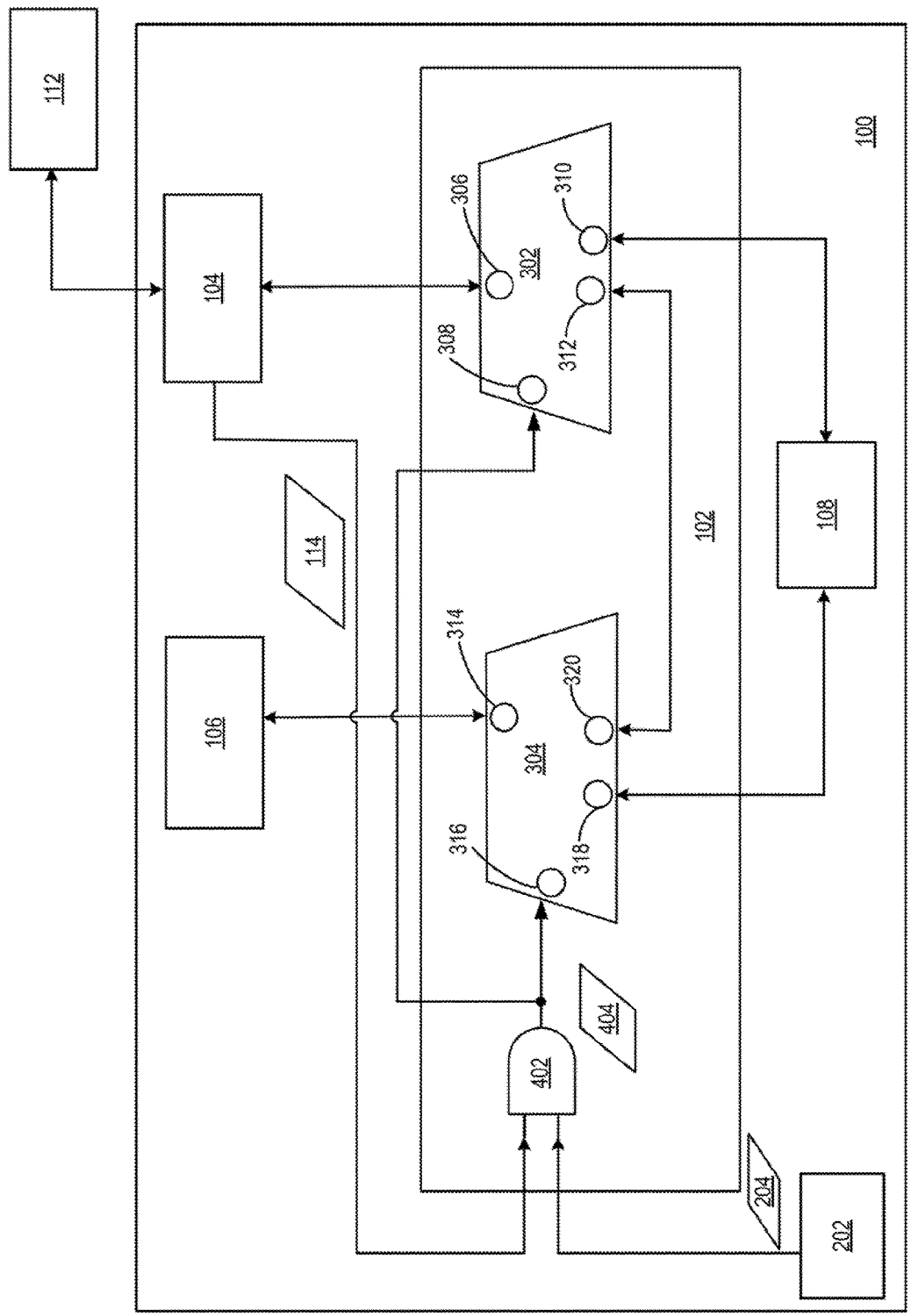
FIG. 4 illustrates an implementation of an input data switch to selectively route input data between a first computing device and a second computing device, according to an example.

FIG. 4 illustrates an implementation of input data switch 102 to selectively route input data between first computing device 100 and second computing device 112, according to an example. When first computing device 100 includes BIOS 202 to provide enable signal 204 to input data switch 102, input data switch 102 may include a logic gate 402 to detect both signal 114 and enable signal 204. Logic gate 402 may implement a logical AND function. Thus, when logic gate 402 detects both signal 114 and enable signal 204, logic gate 402 may assert a bridging signal 404 to selector ports 308 and 316 of multiplexers 302 and 304, respectively. In response to detecting bridging signal 404, multiplexers 302 and 304 may establish a data path between data communication interfaces 104 and 106 in the same manner as described in FIG. 3. Although logic gate 402 is shown to be part of input data switch 102, it should be understood that logic gate 402 may be located outside of input data switch 102.

Figure 5:
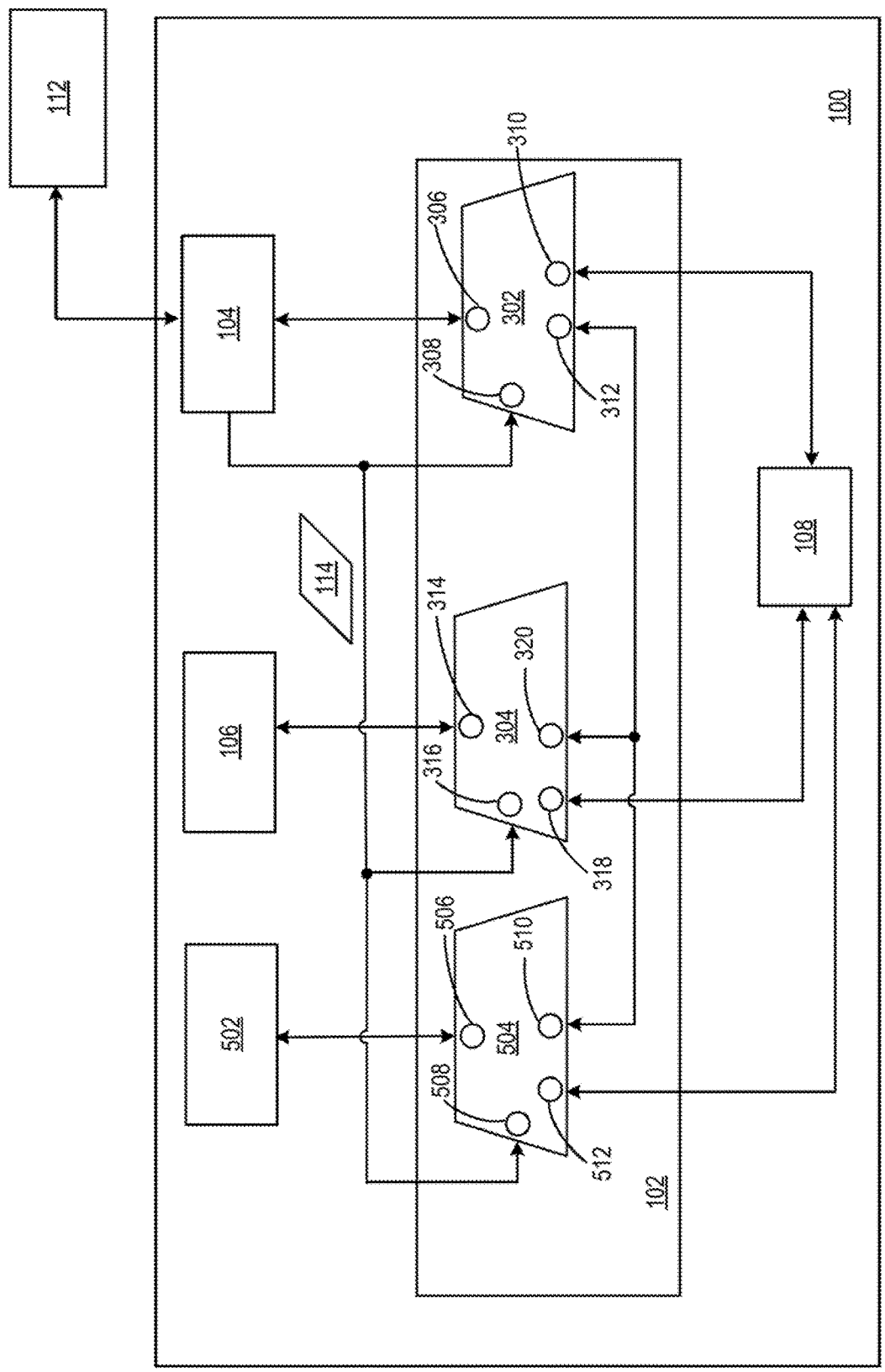
FIG. 5 illustrates a first computing device having an input data switch to selectively route input data between the first computing device and a second computing device, according to an example.

FIG. 5 illustrates first computing device 100 having input data switch 102 to selectively route input data between first computing device 100 and a second computing device 112, according to an example. In some examples, first computing device 100 may also include a third data communication interface 502 that is similar to data communication interfaces 104 and 106. Input data switch 102 may include a third multiplexer 504 to route data associated with third data communication interface 502. Third multiplexer 504 may be similar to multiplexers 302 and 304. Third multiplexer 504 may include a data port 506 that is connected to third data communication interface 502. Third multiplexer 504 may also include a selector port 508 that is connected to first data communication interface 104 unidirectionally. Third multiplexer 504 may further include a data port 510 that is connected to data ports 310 and 320 of multiplexers 302 and 304, respectively. Third multiplexer 504 may further include a data port 512 that is connected to controller 108.

Operations of third multiplexer 504 may be similar to operations of multiplexers 302 and 304. Thus, when signal 114 is detected by multiplexers 302, 304, and 504, multiplexers 304 and 504 may route input data received at data communication interfaces 106 and 502, respectively, to second computing device 112 via first data communication interface 104.

Figure 6:
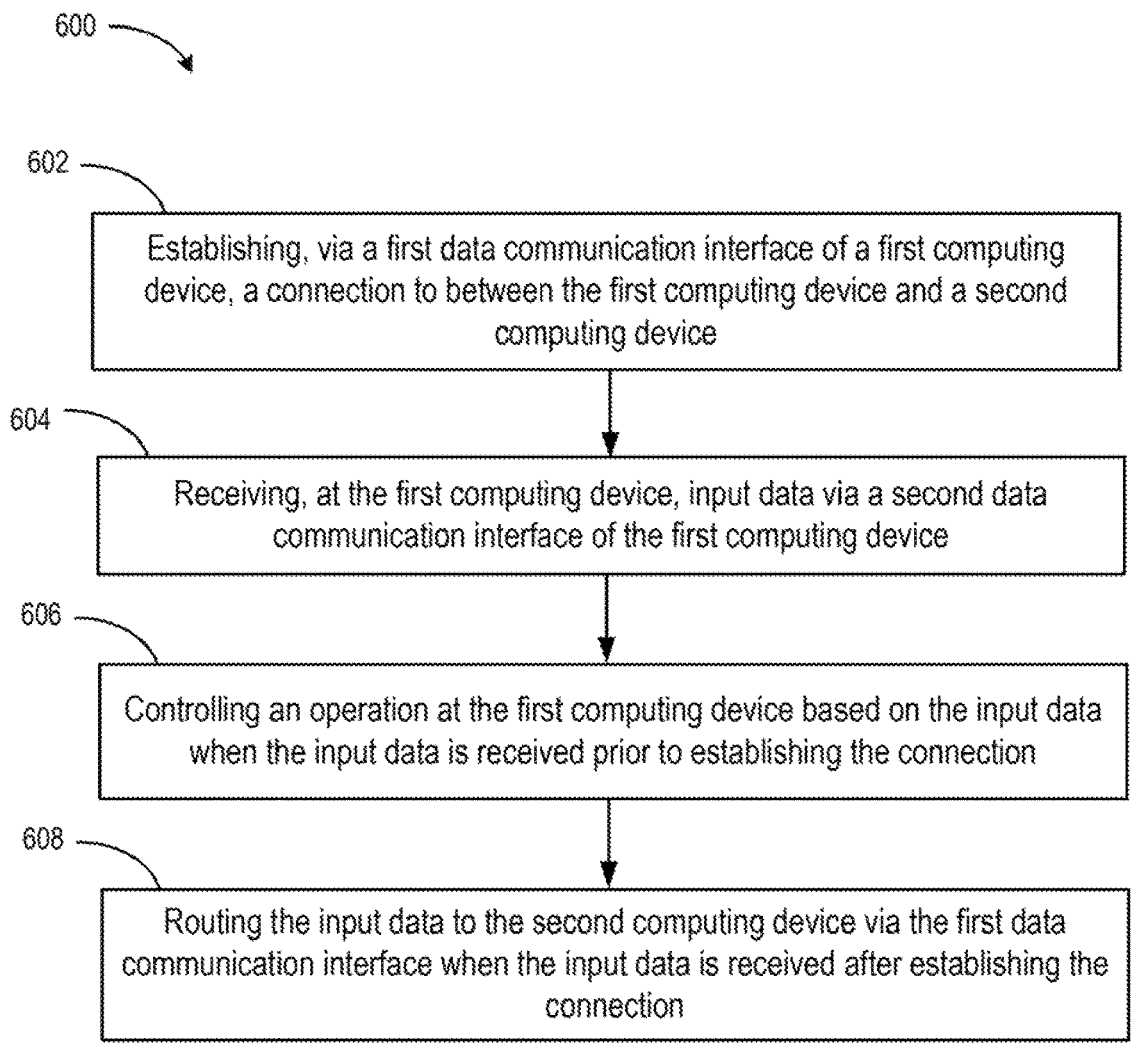
FIG. 6 illustrates a method of operation at a first computing device to selectively route input data between the first computing device and a second computing device, according to an example.

FIG. 6 illustrates a method 600 of operation at first computing device 100 to selectively route input data between first computing device 100 and second computing device 112, according to an example. Method 600 includes establishing, via a first data communication interface of a first computing device, a connection to between the first computing device and a second computing device, at 602. For example, referring to FIG. 1B, second computing device 112 may be connected to first computing device via first data communication interface 104.

Method 600 also includes receiving, at the first computing device, input data via a second data communication interface of the first computing device, at 604. For example, referring to FIG. 1A, first computing device 100 may receive input data 110 at second data communication interface 106.

Method 600 further includes controlling an operation at the first computing device based on the input data when the input data is received prior to establishing the connection, at 606. For example, referring to FIG. 1A, controller 108 may process input data 110 to control an operation of first computing device 100 as input data 110 is received prior to first computing device connecting to second computing device.

Method 600 further includes routing the input data to the second computing device via the first data communication interface when the input data is received after establishing the connection, at 608. For example, referring to FIG. 1B, when first computing device receives input data 116 (received after first computing device 100 is connected to second computing device 112) at second data communication interface 106, input data switch 102 may route input data 116 from second data communication interface 106 to second computing device 112 via first data communication interface 104.

The use of "comprising", "including" or "having" are synonymous and variations thereof herein are meant to be inclusive or open-ended and do not exclude additional unrecited elements or method steps.

What is claimed is:

1. A method comprising:
   establishing, via a first data communication interface of a first computing device, a connection between the first computing device and a second computing device, wherein the first computing device further comprises a second data communication interface connected to a user input device;
   in response to receiving a hot-plug signal received from the second computing device at the first data communication interface wherein the hot-plug signal indicates the establishment of the connection:
      disabling, using a data switch in the first computing device, a first data path from the second data communication interface to a controller of the first computing device, and
      establishing a second data path through the data switch between the first data communication interface and the second data communication interface;
   receiving, at the first computing device, first input data and second input data at the second data communication interface from the user input device;
   controlling, by the controller, an operation at the first computing device based on the first input data from the user input device received by the controller over the first data path prior to establishing the connection and prior to the disabling of the first data path; and
   routing the second input data, received after establishing the connection, over the second data path to the second computing device via the data switch and the first data communication interface, the second input data from the user input device routed to the second computing device to control the second computing device.

2. The method of claim 1, wherein the user input device is shared by the first computing device and the second computing device.

3. The method of claim 1, wherein the first data communication interface and the second data communication interface are Universal Serial Bus (USB) interfaces.

4. The method of claim 1, wherein the data switch comprises a plurality of multiplexers.

5. A first computing device comprising:
   a controller;
   a first data communication interface to establish a connection between the first computing device and a second computing device;
   a second data communication interface to receive input data from a user input device external of the first computing device and connected to the second data communication interface; and
   an input data switch to, in response to receiving a hot-plug signal received from the second computing device at the first data communication interface wherein the hot-plug signal indicates the establishment of the connection:
      disable a first data path between the controller and the second data communication interface,
      establish a second data path through the input data switch between the first data communication interface and the second data communication interface, and
      after establishing the connection, route first input data from the user input device received at the second data communication interface over the second data path to the second computing device via the first data communication interface, the first input data from the user input device routed to the second computing device to control the second computing device, wherein the controller is to control an operation of the first computing device based on second input data from the user input device received by the controller over the first data path prior to establishing the connection and prior to the disabling of the first data path.

6. The first computing device of claim 5, wherein the first data communication interface and the second data communication interface are Universal Serial Bus (USB) interfaces.

7. The first computing device of claim 5, wherein the input data switch comprises a plurality of multiplexers.

8. A first computing device comprising:
 a user input device;
 a controller;
 a first data communication interface to establish a connection between the first computing device and a second computing device;
 a second data communication interface connected to the user input device to receive input data from the user input device; and
 an input data switch to, in response to activation of a hot-plug signal received from the second computing device at the first data communication interface wherein the hot-plug signal indicates the establishment of the connection of the second computing device to the first data communication interface:
  disable a first data path from the second data communication interface to the controller,
  establish a second data path through the input data switch that serves as a logical bridge between the first data communication interface and the second data communication interface, and
  after establishing the connection, route first input data from the user input device received at the second data communication interface over the second data path to the second data communication interface for communication of the first input data from the user input device to the second computing device for controlling the second computing device, wherein the controller is to control an operation of the first computing device based on second input data from the user input device received by the controller over the first data path prior to establishing the connection and prior to the disabling of the first data path.

9. The first computing device of claim 8, wherein the first data communication interface and the second data communication interface are Universal Serial Bus (USB) interfaces.

10. The first computing device of claim 8, wherein the input data switch comprises a plurality of bidirectional multiplexers.

11. The first computing device of claim 8, further comprising a display.

12. The method of claim 1, wherein the data switch performs selective routing of the first input data over the first data path and the second input data over the second data path.

13. The method of claim 12, wherein the data switch performs the selective routing responsive to activation of an enable signal from a Basic Input/Output System (BIOS) of the first computing device.

14. The method of claim 13, wherein deactivation of the enable signal from the BIOS causes the data switch to route input data received at the second data communication interface to the controller but not to the first data communication interface.

15. The first computing device of claim 5, wherein the user input device is shared by the first computing device and the second computing device.

16. The first computing device of claim 15, wherein the input data switch is to perform selective routing of the first input data over the second data path and the second input data over the first data path, responsive to activation of an enable signal from a Basic Input/Output System (BIOS) of the first computing device, and wherein deactivation of the enable signal from the BIOS is to cause the input data switch to route input data received at the second data communication interface to the controller but not to the first data communication interface.

\* \* \* \* \*